(12) United States Patent
Katsumata et al.

(10) Patent No.: US 10,351,018 B2
(45) Date of Patent: Jul. 16, 2019

(54) STATION-BUILDING POWER-SUPPLY DEVICE AND METHOD OF CALCULATING REGENERATION DETERMINING VOLTAGE VALUE

(71) Applicant: MITSUBISHI ELECTRIC CORPORATION, Chiyoda-ku, Tokyo (JP)

(72) Inventors: Hisashi Katsumata, Tokyo (JP); Yasushi Matsumura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 233 days.

(21) Appl. No.: 15/523,464

(22) PCT Filed: Feb. 19, 2015

(86) PCT No.: PCT/JP2015/054616
§ 371 (c)(1),
(2) Date: May 1, 2017

(87) PCT Pub. No.: WO2016/132508
PCT Pub. Date: Aug. 25, 2016

(65) Prior Publication Data
US 2017/0305300 A1   Oct. 26, 2017

(51) Int. Cl.
*B60M 3/02* (2006.01)
*B60M 3/06* (2006.01)
(Continued)

(52) U.S. Cl.
CPC .............. *B60M 3/06* (2013.01); *B60M 3/02* (2013.01); *H02J 1/14* (2013.01); *H02J 3/06* (2013.01);
(Continued)

(58) Field of Classification Search
None
See application file for complete search history.

(56) References Cited

U.S. PATENT DOCUMENTS 9,308,923 B2    4/2016  Matsumura et al.
2010/0308649 A1*  12/2010  Kono .................. B60L 9/005
307/9.1
(Continued)

FOREIGN PATENT DOCUMENTS

EP     1 538 020 A2    6/2005
JP     S58-139826 A    8/1983
(Continued)

OTHER PUBLICATIONS

Extended European Search Report dated Jul. 6, 2018, issued by the European Patent Office in corresponding European Application No. 15882611.5. (8 pages).
(Continued)

*Primary Examiner* — Jared Fureman
*Assistant Examiner* — Aqeel H Bukhari
(74) *Attorney, Agent, or Firm* — Buchanan Ingersoll & Rooney PC

(57) ABSTRACT

A station-building power-supply device includes: a detector that detects a ripple in an overhead line voltage and outputs information on the detected ripple and an overhead line voltage value; a determiner that compares the information with a threshold for determining whether a ripple is in the overhead line voltage, and outputs the overhead line voltage value obtained when a ripple is determined to be not in the overhead line voltage based on the comparison result; an estimator that estimates, based on the overhead line voltage value, a no-load voltage value of an overhead line in a no-load state; a controller that sets an additional value; and a calculator that adds the additional value to the no-load voltage value to calculate a regeneration determining volt-
(Continued)

age value for determining whether an electric vehicle performs regeneration, and outputs the regeneration determining voltage value to a circuit that utilizes energy generated by the regeneration.

10 Claims, 10 Drawing Sheets

(51) Int. Cl.
  H02J 3/06 (2006.01)
  H02J 1/14 (2006.01)
  H02J 3/38 (2006.01)
  H02J 7/00 (2006.01)
  H02M 7/797 (2006.01)

(52) U.S. Cl.
  CPC ............ *H02J 3/381* (2013.01); *H02J 7/0027* (2013.01); *B60L 2200/26* (2013.01); *B60L 2240/10* (2013.01); *H02M 7/797* (2013.01); *Y02E 60/721* (2013.01); *Y02T 10/7055* (2013.01); *Y04S 10/126* (2013.01)

(56) References Cited

U.S. PATENT DOCUMENTS

| | | |
|---|---|---|
| 2014/0149010 A1 | 5/2014 | Li |
| 2015/0094884 A1 | 4/2015 | Matsumura et al. |

FOREIGN PATENT DOCUMENTS

| | | |
|---|---|---|
| JP | 2-077340 A | 3/1990 |
| JP | 8-047279 A | 2/1996 |
| JP | 9-084203 A | 3/1997 |
| JP | 2004-358984 A | 12/2004 |
| JP | 2005-027378 A | 1/2005 |
| JP | 2006-062427 A | 3/2006 |
| JP | 2006-168390 A | 6/2006 |
| JP | 2010-215048 A | 9/2010 |
| JP | 2011-245979 A | 12/2011 |
| JP | 2013-014184 A | 1/2013 |
| JP | 2014-040127 A | 3/2014 |
| JP | 2014-129001 A | 7/2014 |
| JP | 2014-236622 A | 12/2014 |
| WO | WO 2013/005575 A1 | 1/2013 |
| WO | WO 2013/065079 A1 | 5/2013 |

OTHER PUBLICATIONS

International Search Report (PCT/ISA/210) dated May 19, 2015, by the Japanese Patent Office as the International Searching Authority for International Application No. PCT/JP2015/054616.
Written Opinion (PCT/ISA/237) dated May 19, 2015, by the Japanese Patent Office as the International Searching Authority for International Application No. PCT/JP2015/054616.
Japanese Office Action dated Nov. 4, 2015 in Japanese Application No. 2015-545968 (with English translation, 5 pages).
Office Action (Communication pursuant to Article 94(3) EPC) dated Feb. 14, 2019, by the European Patent Office in corresponding European Patent Application No. 15882611.5. (5 pages).

* cited by examiner

STATION-BUILDING POWER-SUPPLY DEVICE AND METHOD OF CALCULATING REGENERATION DETERMINING VOLTAGE VALUE

FIELD

The present invention relates to a station-building power-supply device that utilizes a voltage regenerated by an electric vehicle and generated in an overhead line, and a method of calculating a regeneration determining voltage value.

BACKGROUND

A conventional station-building power-supply device absorbs regenerative energy caused by an electric vehicle and generated on a high-voltage DC side of an overhead line, converts DC power into AC power, and supplies the AC power to station-building facilities on a low-voltage AC side of a station-building AC system. A voltage value of the overhead line rises when the regenerative energy is generated, for example, at the time of deceleration of the electric vehicle. The station-building power-supply device compares the overhead line voltage value with a regeneration determining voltage value for determining whether the electric vehicle connected to the overhead line performs regenerative operation and, when the overhead line voltage value is higher than the regeneration determining voltage value, performs power-absorbing operation. Such a technique is disclosed in Patent Literature 1 below.

In order to efficiently absorb the regenerative energy in the station-building power-supply device, the regeneration determining voltage value is desirably set to be slightly higher than a no-load voltage value that is a voltage value of the overhead line in a no-load state where no voltage change due to power running and regeneration Occurs.

CITATION LIST

Patent Literature

Patent Literature 1: Japanese Patent Application Laid-Open No. 2014-40127

SUMMARY

Technical Problem

According to the above-mentioned conventional technique, however, the overhead line voltage is measured in advance for a certain period, and the constant regeneration determining voltage value is decided at a rough estimate relative to the no-load voltage value. This poses a problem of failure to efficiently absorb the regenerative energy when the no-load voltage value changes to be so low that a voltage difference between the no-load voltage value and the regeneration determining voltage value increases. Another problem is a long test period until the operation of the station-building power-supply device.

The present invention has been made in consideration of the foregoing, and an object of the invention is to obtain a station-building power-supply device capable of efficiently utilizing the regenerative energy.

Solution to Problem

In order to solve the above-mentioned problem and achieve the object, the present invention provides a station-building power-supply device. The station-building power-supply device includes a ripple detection unit to detect a ripple included in an overhead line voltage and output information on the detected ripple and an overhead line voltage value. The station-building power-supply device also includes a ripple determination unit to compare the information on the ripple with a ripple threshold value for determining whether a ripple is included in the overhead line voltage, and output the overhead line voltage value obtained when a ripple is determined to be not included in the overhead line voltage, on a basis of a result of the comparison. The station-building power-supply device also includes a no-load voltage estimation unit to estimate, on a basis of the overhead line voltage value, a no-load voltage value that is a voltage value of an overhead line obtained when the overhead line is in a no-load state. The station-building power-supply device also includes a control unit to set an additional voltage value that is to be added to the no-load voltage value. The station-building power-supply device also includes a calculation unit to add the additional voltage value to the no-load voltage value to calculate a regeneration determining voltage value for determining whether an electric vehicle connected to the overhead line performs regenerative operation, and output the regeneration determining voltage value to a main circuit section that utilizes regenerative energy generated by the regenerative operation.

Advantageous Effects of Invention

The present invention achieves an effect of efficiently utilizing the regenerative energy.

DESCRIPTION OF EMBODIMENTS

Hereinafter, a station-building power-supply device and a method of computing a regeneration determining voltage value according to embodiments of the present invention will be described in detail based on the drawings. The present invention is not limited to the embodiments.

First Embodiment.

Figure 1:
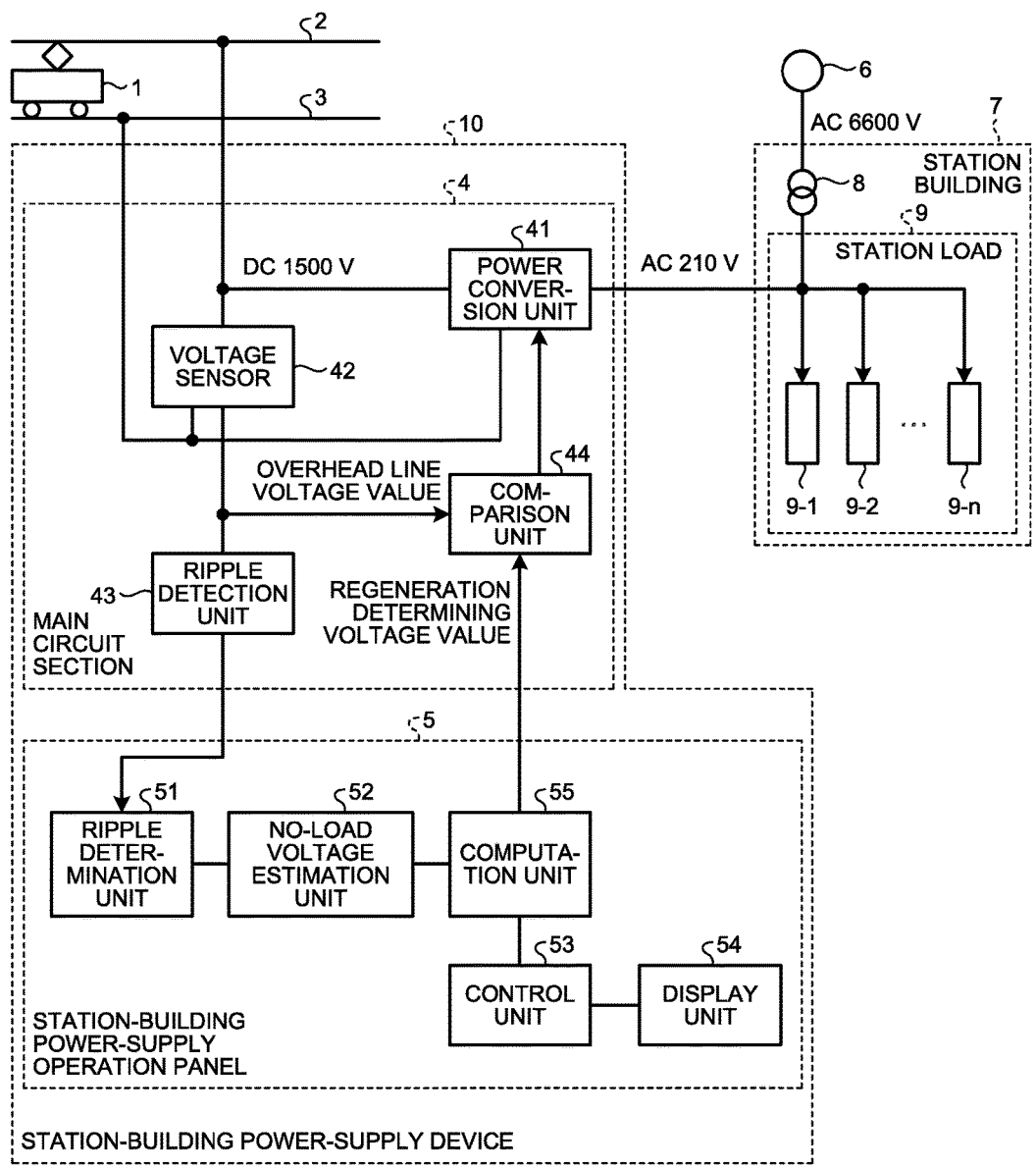
FIG. 1 is a block diagram illustrating an exemplary configuration of a station-building power-supply device according to a first embodiment of the present invention.

FIG. 1 is a block diagram illustrating an exemplary configuration of a station-building power-supply device according to a first embodiment of the present invention. The station-building power-supply device 10 includes a main circuit section 4 and a station-building power-supply operation panel 5. The main circuit section 4 absorbs regenerative energy generated in an overhead line 2 by decelerating operation or the like of an electric vehicle 1, converts DC power of the overhead line 2 into AC power, and outputs the AC power to a station building 7. The station-building power-supply operation panel 5 controls the operation of the main circuit section 4.

The main circuit section 4 that utilizes the regenerative energy includes a power conversion unit 41, a voltage sensor 42, a ripple detection unit 43, and a comparison unit 44. The power conversion unit 41 converts the DC 1500V-based DC power of the regenerative energy generated in the overhead line 2 into the AC 210V-based AC power, and outputs the AC power to the station building 7. The voltage sensor 42 detects a DC 1500V-based overhead line voltage between the overhead line 2 and a rail 3. The ripple detection unit 43 detects a ripple included in the overhead line voltage detected by the voltage sensor 42, and outputs information on the detected ripple and an overhead line voltage value obtained when the ripple is detected. The comparison unit 44 compares the overhead line voltage value detected by the voltage sensor 42 with a regeneration determining voltage value decided by the station-building power-supply operation panel 5 for determining whether the electric vehicle 1 connected to the overhead line 2 performs regenerative operation, and controls the operation of the power conversion unit 41 on the basis of the comparison result.

The station-building power-supply operation panel 5 includes a ripple determination unit 51, a no-load voltage estimation unit 52, a control unit 53, a display unit 54, and a calculation unit 55. The ripple determination unit 51 compares the information on the ripple acquired from the ripple detection unit 43 with a ripple threshold value for determining whether a ripple is included in the overhead line voltage, and outputs the overhead line voltage value obtained when a ripple is determined to be not included in the overhead line voltage, on the basis of the result of the comparison. The no-load voltage estimation unit 52 estimates a no-load voltage value on the basis of the overhead line voltage value output from the ripple determination unit 51. The no-load voltage value is a voltage value of the overhead line 2 obtained when the overhead line 2 is in a no-load state. The control unit 53 sets an additional voltage value that is to be added to the no-load voltage value. The display unit 54 displays information such as the decided regeneration determining voltage value. The calculation unit 55 adds the additional voltage value set by the control unit 53 to the no-load voltage value estimated by the no-load voltage estimation unit 52 to thereby calculate the regeneration determining voltage value for determining whether the electric vehicle 1 connected to the overhead line 2 performs the regenerative operation, and outputs the calculated regeneration determining voltage value to the comparison unit 44 of the main circuit section 4 that utilizes the regenerative energy generated by the regenerative operation.

The station building 7 includes a transformer 8 and various station loads 9-1, 9-2, . . . , 9-n (hereinafter referred to as the station loads 9) such as an air conditioner, a lighting device, and an elevator installed in a station. The transformer 8 converts an AC 6600V-based voltage supplied from a high-voltage distribution system 6 into an AC 210V-based voltage.

The station-building power-supply device 10 compares the overhead line voltage value of the overhead line 2 with the regeneration determining voltage value, determines that the electric vehicle 1 is in the middle of the regenerative operation when the overhead line voltage value of the overhead line 2 is greater than the regeneration determining voltage value, converts the DC power of the overhead line 2 into the AC power with the power conversion unit 41, and outputs the AC power to the station loads 9.

Figure 2:
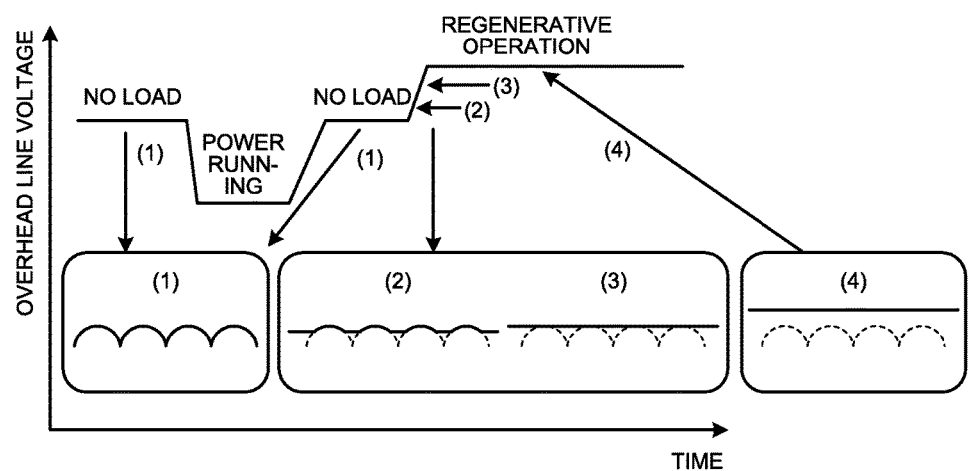
FIG. 2 is a diagram illustrating a change in overhead line voltage according to the first embodiment.

Next, a method of obtaining the regeneration determining voltage value in the station-building power-supply device 10 of the present embodiment will be described. First, the overhead line voltage detected by the voltage sensor 42 will be described. FIG. 2 is a diagram illustrating changes in the overhead line voltage according to the first embodiment. In FIG. 2, the horizontal axis indicates the time, and the vertical axis indicates the overhead line voltage of the overhead line 2. The graph in FIG. 2 illustrates the overhead line voltage that changes as the electric vehicle 1 shifts from the no-load state through a power running state and then through the no-load state to the regenerative operation state. In the no-load state, the electric vehicle 1 neither accelerates nor decelerates. In the power running state, for example, the electric vehicle 1 accelerates. In the regenerative operation state, for example, the electric vehicle 1 decelerates. The magnitude of the overhead line voltage illustrated in FIG. 2 indicates an effective value in each state. In practice, the ripple is included in the overhead line voltage in the no-load state. A detailed waveform in the no-load state (1) is indicated in a lower frame. Power is supplied from a substation (not illustrated in FIG. 1) to the overhead line 2, and the ripple is included in the overhead line voltage due to an influence of a rectifier in the substation.

When the overhead line 2 shifts from the no-load state to the regenerative operation state, the overhead line voltage rises due to the regenerative energy generated by the electric vehicle 1. As the overhead line voltage rises, a valley of the ripple illustrated by the detailed waveform (1) is pushed up to become shallow. In the transition state (2) from the no-load state to the regenerative operation, the valley of the ripple is shallow. When the overhead line voltage further increases, the voltage value of the overhead line voltage becomes equal to that of a peak of the ripple in the state (3). In the regenerative operation state (4), the overhead line voltage further rises, and thus the overhead line voltage becomes greater than the peak of the ripple.

The station-building power-supply device 10 determines that the overhead line voltage is equal to the ripple peak voltage when the ripple disappears from the overhead line voltage, that is, when a frequency component disappears from the overhead line voltage. The station-building power-supply device 10 then obtains the ripple peak voltage, so that the station-building power-supply device 10 can calculate the effective value of the overhead line voltage represented by the ripple waveform, namely, the no-load voltage value in the state (1).

Figure 3:
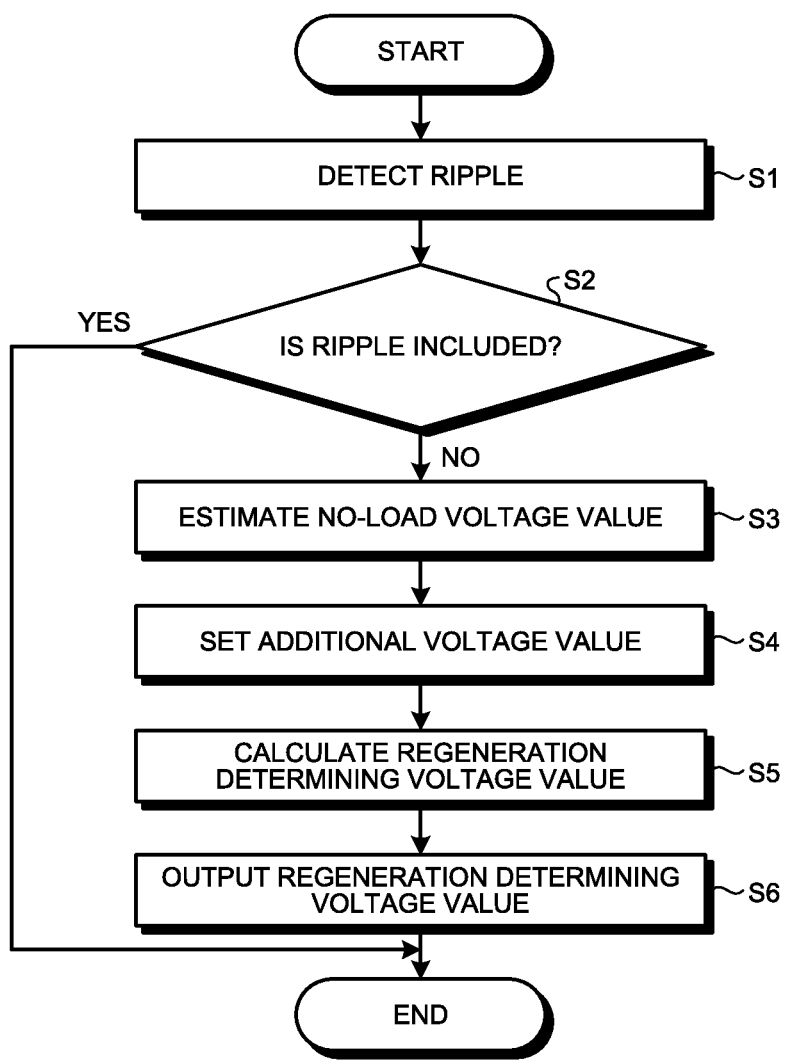
FIG. 3 is a flowchart illustrating processing in the method of calculating the regeneration determining voltage value in the station-building power-supply device according to the first embodiment.

The method of calculating the regeneration determining voltage value in the station-building power-supply device 10 will be described in detail. FIG. 3 is a flowchart illustrating processing in the method of calculating the regeneration determining voltage value in the station-building power-supply device 10 according to the first embodiment.

First, the ripple detection unit 43 detects the ripple included in the overhead line voltage detected by the voltage sensor 42 (step S1). More specifically, the ripple detection unit 43 analyzes frequency components of the overhead line voltage. Since the rectifier in the substation is typically a six-pulse rectifier or a twelve-pulse rectifier, the ripple detection unit 43 analyzes the frequency components about sixth-order and twelfth-order frequencies of the frequency of power at an installation place. For example, in a case where the place for installation of the substation is in a region with a frequency of 50 Hz, the ripple detection unit 43 records the magnitude of the ripple, i.e., the voltage value indicating the height from the valley of the ripple to the ripple peak about each of the six-order frequency of 300 Hz and the twelfth-order frequency of 600 Hz. Examples of the analysis result include "xx V at a frequency of 300 Hz" and "yy V at a frequency of 600 Hz". The smaller the ripple is, i.e., the higher the overhead line voltage is, the smaller the voltage value indicating the height from the valley of the ripple to the ripple peak is. When the ripple is not included, the voltage value indicating the height from the valley of the ripple to the ripple peak is 0 V.

The ripple detection unit 43 may further analyze the frequency components about 18th-order and 24th-order frequencies of the frequency of the power at the installation place. In a case where the place for the installation of the substation is in a region with a frequency of 50 Hz, the 18th-order frequency is 900 Hz, and the 24th-order frequency is 1200 Hz. Even when it is known whether the rectifier used in the substation is a six-pulse rectifier or a twelve-pulse rectifier, the ripple detection unit 43 does not analyze only a single frequency component but analyzes a plurality of frequency components, thereby reducing an influence of false detection due to a detection error at the time of the ripple detection.

The ripple detection unit 43 may indicate the analysis result of the frequency components by using a content rate of the ripple instead of using the voltage value representing the magnitude of the ripple. Examples of the analysis result represented using the content rate include "xx % at a frequency of 300 Hz" and "yy % at a frequency of 600 Hz". The smaller the ripple is, i.e., the higher the overhead line voltage is, the smaller the content rate of the ripple is. When the ripple is not included, the content rate is 0%. The ripple detection unit 43 can obtain the analysis result of the frequency components by using the fast Fourier transform (FFT), regardless of whether the analysis result is represented by the voltage value or the content rate. Accordingly, the device configuration of the ripple detection unit 43 is common to both of these two cases where the analysis result is represented by the voltage value and where the analysis result is represented by the content rate.

The ripple detection unit 43 outputs the information on the detected ripple, i.e., the analysis result of the frequency components of the ripple to the ripple determination unit 51 together with the overhead line voltage value at the time of the ripple detection.

The ripple determination unit 51 compares the information on the ripple acquired from the ripple detection unit 43 with the ripple threshold value for determining whether the ripple is included in the overhead line voltage, and determines whether the ripple is included in the overhead line voltage (step S2).

The ripple threshold value is represented by "aa V" when the analysis result of the frequency components is the information indicated by the voltage value, and the ripple threshold value is represented by "bb %" when the analysis result of the frequency components is the information indicated by the content rate. When the information on the ripple acquired from the ripple detection unit 43 is the voltage value less than "aa V" or is the content rate less than "bb %", the ripple determination unit 51 determines that the ripple is not included in the overhead line voltage. In the ripple determination unit 51, when the value of the information on the ripple is not zero but less than the ripple threshold value, the overhead line voltage can be regarded to be free from the ripple since the ripple included in the overhead line voltage is small.

In the above example, in a case where the ripple determination unit 51 acquires pieces of information on the ripples about the frequencies of 300 Hz and 600 Hz from the ripple detection unit 43, the ripple determination unit 51 determines that the ripple is not included in the overhead line voltage when both the pieces of information on the ripples about the frequencies of 300 Hz and 600 Hz are less than the ripple threshold value. Further, in a case where the ripple determination unit 51 acquires pieces of information on the ripples about the frequencies of 900 Hz and 1200 Hz, the ripple determination unit 51 determines that the ripple is not included in the overhead line voltage when all the pieces of information on the ripples are less than the ripple threshold value.

When the information on the ripple acquired from the ripple detection unit 43 is less than the ripple threshold value, the ripple determination unit 51 determines that the ripple is not included in the overhead line voltage (step S2: No). When the ripple determination unit 51 determines that the ripple is not included in the overhead line voltage, the ripple determination unit 51 records information on the overhead line voltage value acquired from the ripple detection unit 43 together with the information on the ripple. The ripple determination unit 51 then outputs the recorded information on the overhead line voltage value to the no-load voltage estimation unit 52. When the information on the ripple is equal to or greater than the ripple threshold value, the ripple determination unit 51 determines that the ripple is included in the overhead line voltage (step S2: Yes), and terminates the processing.

When the ripple is not included in the overhead line voltage, that is, when the overhead line voltage rises due to the regenerative operation of the electric vehicle 1, the ripple determination unit 51 outputs the information on the overhead line voltage value to the no-load voltage estimation unit 52. The ripple determination unit 51 continues the operation of outputting the pieces of information on the overhead line voltage values to the no-load voltage estimation unit 52 while the condition of step S2 is not satisfied, that is, while the electric vehicle 1 performs the regenerative operation.

The no-load voltage estimation unit 52 estimates, from the information on the overhead line voltage value acquired from the ripple determination unit 51, the no-load voltage value of the overhead line 2 in the no-load state which is neither the power running state nor the regenerative operation state (step S3). The no-load voltage estimation unit 52 continues acquiring the pieces of information on the overhead line voltage values from the ripple determination unit 51 during a period in which the ripple is not included in the overhead line voltage in the ripple determination unit 51. As illustrated by (4) in FIG. 2, the raised overhead line voltage is greater than the ripple peak value. The no-load voltage estimation unit 52 can perform calculation to estimate the no-load voltage value when the overhead line voltage value is one shown in (3) of FIG. 2, namely, when the overhead line voltage value is at the ripple peak. In the no-load voltage estimation unit 52, the overhead line voltage value at the ripple peak is a minimum one of the overhead line voltage values that can be acquired from the ripple determination unit 51.

Therefore, the no-load voltage estimation unit 52 estimates the no-load voltage value by using the information on the minimum overhead line voltage value among the pieces of information on the overhead line voltage values acquired from the ripple determination unit 51. More specifically, assuming that the minimum value of the overhead line voltage values Vrms0 acquired from the ripple determination unit 51 is V'rms0 and the effective value of the no-load voltage value is Vn, the no-load voltage estimation unit 52 can estimate the no-load voltage value by using the following formula. In the following description, the no-load voltage value is denoted by Vn.

$$Vn = V'rms0 \times 1.35/\sqrt{(2)}$$

In the above formula, $\sqrt{(2)}$ represents the square root of two. A line indicated by reference numeral (3) in the frame of FIG. 2 is in contact with the ripple represented by a dotted line and is the ripple peak value V'rms0.

The no-load voltage estimation unit 52 outputs the estimated no-load voltage value Vn to the calculation unit 55.

The control unit 53 displays, on the display unit 54, the information such as the no-load voltage value Vn acquired from the calculation unit 55, receives operation from a user or the like who has viewed the display unit 54, and sets the additional voltage value that is to be added to the no-load voltage value Vn (step S4). As described in Background, the regeneration determining voltage value is preferably set to be slightly higher than the no-load voltage value Vn in order to efficiently utilize the regenerative energy in the station-building power-supply device 10. The control unit 53 sets the additional voltage value that is a voltage difference between the no-load voltage value Vn and the regeneration determining voltage value, and outputs the set additional voltage value to the calculation unit 55.

The calculation unit 55 calculates the regeneration determining voltage value by adding the additional voltage value acquired from the control unit 53 to the no-load voltage value Vn acquired from the no-load voltage estimation unit 52 (step S5). Although, as mentioned above, the regeneration determining voltage value is desirably set to be slightly higher than the no-load voltage value Vn, the comparison unit 44 of the main circuit section 4 can frequently change its determination or make false determination if no margin is allowed relative to the no-load voltage value Vn. For this reason, the control unit 53 sets the additional voltage value in consideration of the false operation of the comparison unit 44. The calculation unit 55 then outputs the calculated regeneration determining voltage value to the comparison unit 44 of the main circuit section 4 (step S6).

The comparison unit 44 compares the overhead line voltage value input from the voltage sensor 42 with the regeneration determining voltage value input from the calculation unit 55. When the overhead line voltage value is greater than the regeneration determining voltage value, the comparison unit 44 determines that the electric vehicle 1 is in the regenerative operation state, and controls the power conversion unit 41 so that the power of the overhead line 2 is converted and output to the station building 7.

Since the voltage transmitted from the substation varies, the voltage of the overhead line 2 is not always constant with the result that the no-load voltage value varies. The station-building power-supply device 10 first estimates the no-load voltage value from the current voltage value of the overhead line 2, and adds the additional voltage value to the estimated no-load voltage value, thereby setting the regeneration determining voltage value for determining whether the electric vehicle 1 is in the regenerative operation state. Since the variation of the voltage value of the overhead line 2 varies the estimated no-load voltage value, the station-building power-supply device 10 can vary the regeneration determining voltage value by estimating the no-load voltage value that varies in response to the variation of the overhead line voltage and calculating the regeneration determining voltage value by the use of the no-load voltage value.

The configuration of the main circuit section 4 is not limited to the configuration illustrated in FIG. 1. As in the case of Patent Literature 1 mentioned above, the present embodiment is applicable to a main circuit section including a power storage unit that stores surplus power of the regenerative energy.

Figure 4:
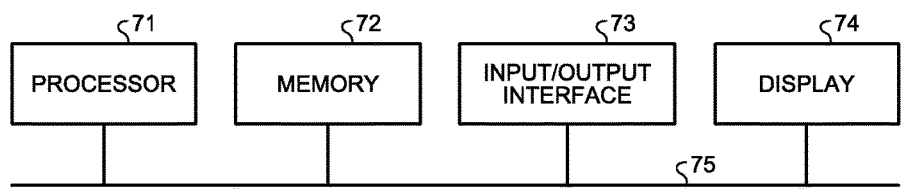
FIG. 4 is a diagram illustrating the hardware configuration of the station-building power-supply device according to the first embodiment.

A hardware configuration that realizes a partial configuration of the block diagram of the station building power supply device 10 illustrated in FIG. 1 will be described. FIG. 4 is a diagram illustrating the hardware configuration of the station-building power-supply device 10 according to the first embodiment. In the station-building power-supply device 10, the power conversion unit 41, the voltage sensor 42, the ripple detection unit 43, the comparison unit 44, the ripple determination unit 51, the no-load voltage estimation unit 52, and the calculation unit 55 are realized by a processor 71 executing programs for the respective components stored in a memory 72 such as a random access memory (RAM) and a read only memory (ROM). The display unit 54 is realized by a display 74 such as a liquid crystal display (LCD). The control unit 53 is realized by the processor 71 executing a program for the control unit 53 stored in the memory 72 as well as by an input/output interface 73. The processor 71, the memory 72, the input/output interface 73, and the display 74 are connected by a system bus 75. In the station-building power-supply device 10, a plurality of processors 71 and a plurality of memories 72 may cooperate to execute the functions of the respective components illustrated in each block diagram. Although the station-building power-supply device 10 can be realized by the hardware configuration illustrated in FIG. 4, the station-building power-supply device 10 can be implemented using either software or hardware. Respective components of the station-building power-supply device that are described in the following embodiments can also be realized by the hardware configuration illustrated in FIG. 4.

As described above, according to the present embodiment, the station-building power-supply device 10 detects the ripple included in the overhead line voltage, estimates the no-load voltage value of the overhead line 2 in the no-load state from the overhead line voltage value obtained when the ripple is determined to be not included in the overhead line voltage, and adds the additional voltage value to the no-load voltage value to thereby calculate the regeneration determining voltage value. Consequently, even when the transmission voltage transmitted from the substation to the overhead line 2 varies and thus the no-load voltage varies, the regeneration determining voltage value can be calculated in response to the variation of the no-load voltage.

Second Embodiment.

In the present embodiment, setting of a range for the no-load voltage value will be described.

Figure 5:
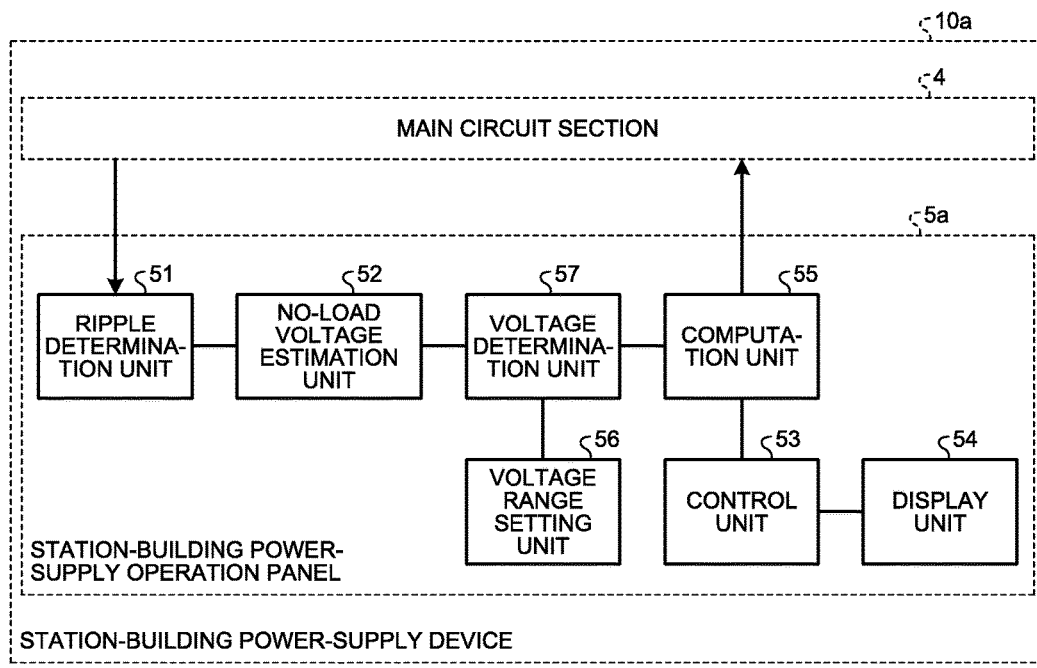
FIG. 5 is a block diagram illustrating an exemplary configuration of a station-building power-supply device according to the second embodiment.

FIG. 5 is a block diagram illustrating an exemplary configuration of a station-building power-supply device 10a according to the second embodiment. The configuration of the main circuit section 4 of the station-building power-supply device 10a is similar to that of the main circuit section 4 of the first embodiment illustrated in FIG. 1. A station-building power-supply operation panel 5a is the station-building power-supply operation panel 5 with a voltage range setting unit 56 and a voltage determination unit 57 added. The voltage range setting unit 56 sets a setting upper limit value and a setting lower limit value to thereby set a voltage range of the no-load voltage value estimated by the no-load voltage estimation unit 52. The voltage determination unit 57 determines whether the no-load voltage value estimated by the no-load voltage estimation unit 52 is within the voltage range set by the voltage range setting unit 56.

Although the overhead line voltage varies as mentioned above, the overhead line voltage cannot necessarily have any value. Generally, a limited range of overhead line voltages is used to run the electric vehicle 1. Therefore, the voltage range setting unit 56 sets the setting upper limit value and the setting lower limit value of the no-load voltage value to thereby set the voltage range of the no-load voltage value. The voltage determination unit 57 determines whether the no-load voltage value estimated by the no-load voltage estimation unit 52 is within the voltage range set by the voltage range setting unit 56. The voltage determination unit 57 outputs the no-load voltage value to the calculation unit 55 when the no-load voltage value is within the voltage range. The voltage determination unit 57 dismisses the no-load voltage value and does not output the no-load voltage value to the calculation unit 55 when the no-load voltage value is outside the voltage range.

The station-building power-supply operation panel 5a may be configured such that the function of the voltage range setting unit 56 is executed by the control unit 53 without the voltage range setting unit 56 being provided.

Figure 6:
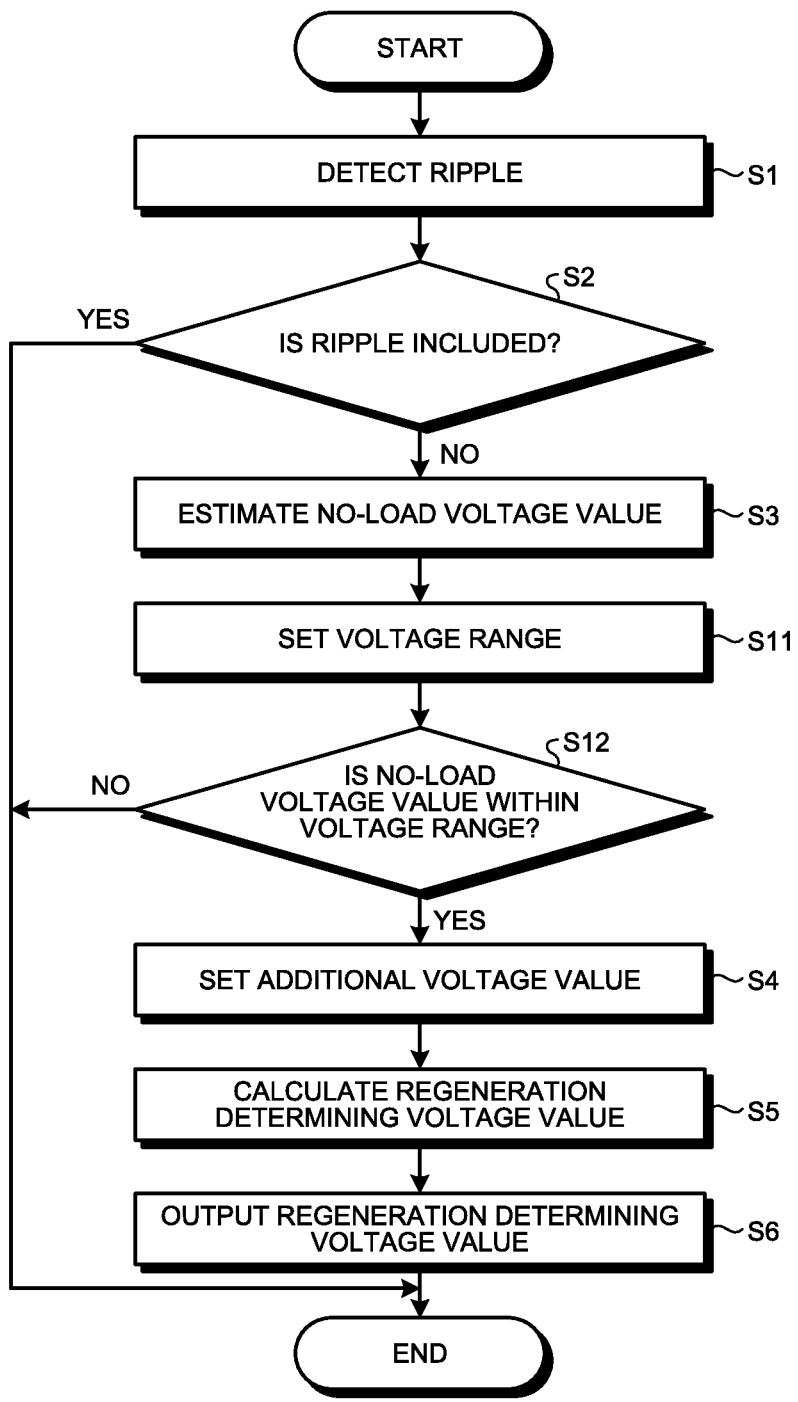
FIG. 6 is a flowchart illustrating processing in a method of calculating the regeneration determining voltage value in the station-building power-supply device according to the second embodiment.

The above operation is further described with reference to a flowchart. FIG. 6 is a flowchart illustrating processing in a method of calculating the regeneration determining voltage value in the station-building power-supply device 10a according to the second embodiment. The voltage range setting unit 56 sets the setting upper limit value and the setting lower limit value of the no-load voltage value to thereby set the voltage range of the no-load voltage value (step S11). The voltage determination unit 57 determines whether the no-load voltage value estimated by the no-load voltage estimation unit 52 is within the voltage range set by the voltage range setting unit 56 (step S12). When the no-load voltage value is within the voltage range (step S12: Yes), the voltage determination unit 57 outputs the no-load voltage value to the calculation unit 55. When the no-load voltage value is outside the voltage range (step S12: No), the voltage determination unit 57 dismisses the no-load voltage value without outputting the no-load voltage value to the calculation unit 55, and terminates the processing. The processing in steps S1 to S6 is similar to the processing in the first embodiment illustrated in the flowchart of FIG. 3. Although steps S11 and S12 are added between step S3 and step S4 in FIG. 6, step S11 may be performed before step S3 since the processing in step S11 is independent of steps S1 to S3.

As described above, according to the present embodiment, the voltage range is set for the no-load voltage value, and only the no-load voltage value within the set voltage range is used. This makes it possible to prevent a value significantly different from a proper no-load voltage value from being falsely estimated and prevent a regeneration determining voltage value from being set on the basis of the falsely estimated no-load voltage value when a voltage abnormally varies as a result of an unusual operation state such as the electric vehicle 1 being behind schedule or out of service due to an accident.

Third Embodiment.

In the first embodiment, the ripple detection unit 43 is provided in the main circuit section 4. The present embodiment where the ripple detection unit 43 is provided in a station-building power-supply operation panel will be described.

Figure 7:
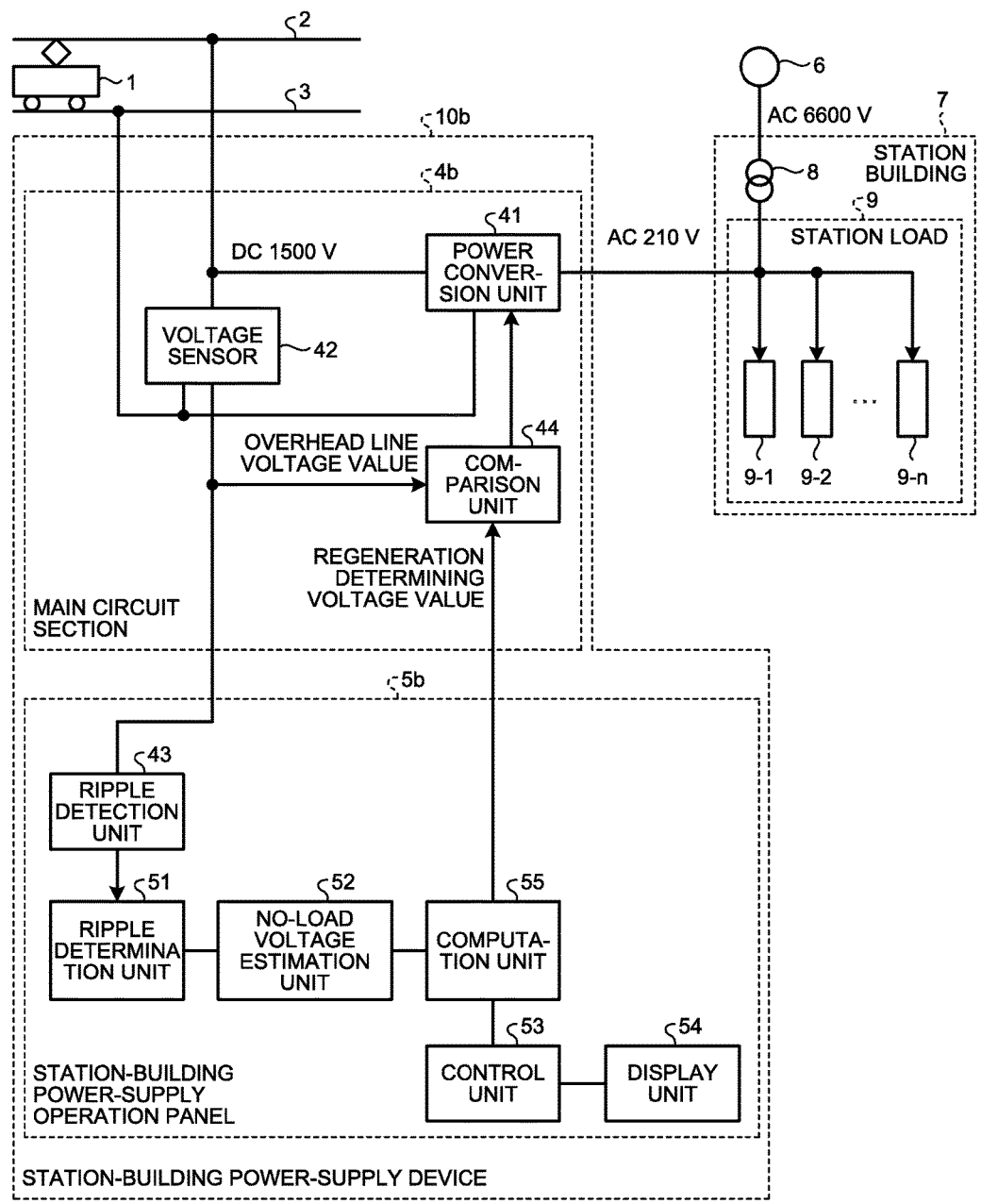
FIG. 7 is a block diagram illustrating an exemplary configuration of a station-building power-supply device according to the third embodiment.

FIG. 7 is a block diagram illustrating an exemplary configuration of a station-building power-supply device 10b according to the third embodiment. In the station-building power-supply device 10b, a main circuit section 4b is the main circuit section 4 with the ripple detection unit 43 deleted, and a station-building power-supply operation panel 5b is the station building power supply operation panel 5 with the ripple detection unit 43 added.

The operation of the station-building power-supply device 10b is similar to that of the station building power supply device 10 of the first embodiment except only for the arrangement of the ripple detection unit 43. In the present embodiment, since the ripple detection unit 43 is provided in the station-building power-supply operation panel 5b, the configuration of the main circuit section 4b can be similar to that of the conventional main circuit section that employs a constant regeneration determining voltage value. In other words, the station-building power-supply operation panel 5b includes all the characteristic components to variably set the regeneration determining voltage values in the station building power supply device 10b.

As described above, according to the present embodiment, the ripple detection unit 43 is provided on the station-building power-supply operation panel side, not on the main circuit section side. Consequently, an effect similar to that of the first embodiment can be obtained while the main circuit section is configured in the conventional manner.

Fourth Embodiment.

The present embodiment that is the third embodiment modified to set a range of the no-load voltage value will be described.

Figure 8:
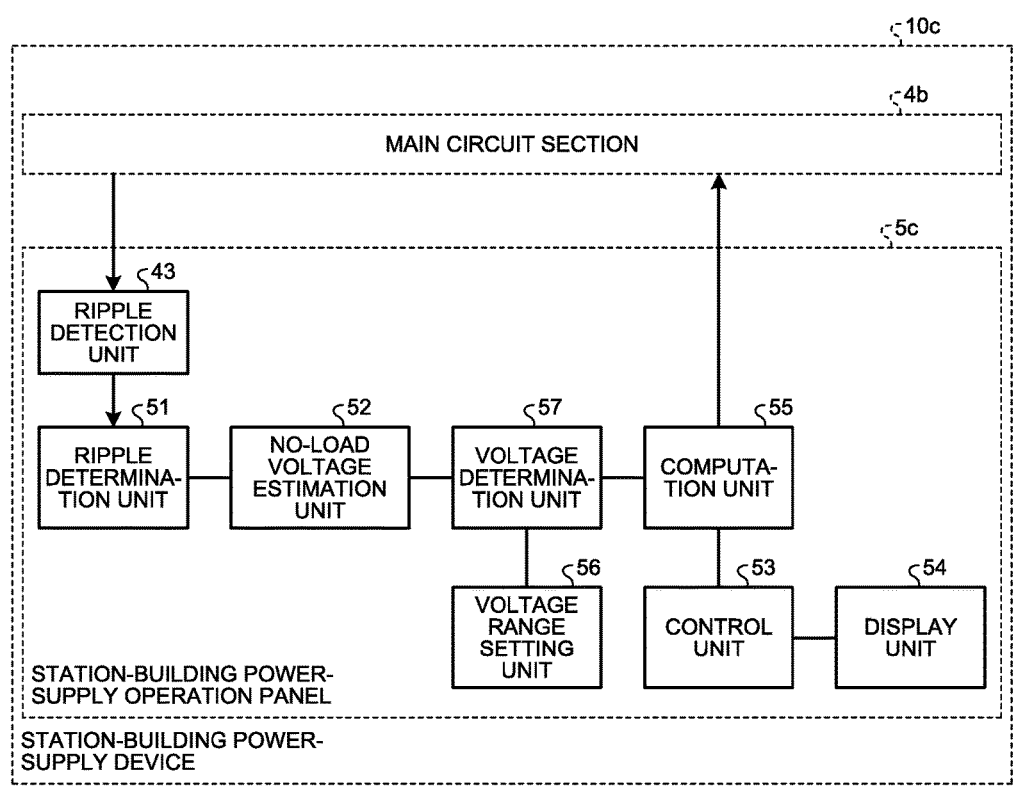
FIG. 8 is a block diagram illustrating an exemplary configuration of a station-building power-supply device according to the fourth embodiment.

FIG. 8 is a block diagram illustrating an exemplary configuration of a station-building power-supply device 10c according to the fourth embodiment. The configuration of the main circuit section 4b of the station-building power-supply device 10c is similar to that of the third embodiment illustrated in FIG. 7. A station-building power-supply operation panel 5c is the station-building power-supply operation panel 5b with the voltage range setting unit 56 and the voltage determination unit 57 added. The voltage range setting unit 56 sets the setting upper limit value and the setting lower limit value to thereby set the voltage range of the no-load voltage value estimated by the no-load voltage estimation unit 52. The voltage determination unit 57 determines whether the no-load voltage value estimated by the no-load voltage estimation unit 52 is within the voltage range set by the voltage range setting unit 56.

The operation of the station-building power-supply device 10*c* is similar to that of the station-building power-supply device 10*a* of the second embodiment except only for the arrangement of the ripple detection unit 43. In the present embodiment, since the ripple detection unit 43 is provided in the station building power supply operation panel 5*c*, the configuration of the main circuit section 4*b* can be similar to that of the conventional main circuit section that employs a constant regeneration determining voltage value. In other words, the station-building power-supply operation panel 5*c* includes all the characteristic components to variably set the fluctuating regeneration determining voltage values in the station-building power-supply device 10*c*.

The station-building power-supply operation panel 5*c* may be configured such that the function of the voltage range setting unit 56 is executed by the control unit 53 without the voltage range setting unit 56 being provided.

As described above, according to the present embodiment, the ripple detection unit 43 is provided on the station-building power-supply operation panel side, not on the main circuit section side. Consequently, an effect similar to that of the second embodiment can be obtained while the main circuit section is configured in the conventional manner.

Fifth Embodiment.

The present embodiment where the calculation unit 55 outputs an average value of a plurality of regeneration determining voltage values to the main circuit section 4 will be described. Although the present embodiment is described using the station-building power supply-device 10 of the first embodiment, the present embodiment is applicable to the station-building power-supply devices 10*a*, 10*b*, and 10*c* of the second to fourth embodiments.

The configuration of the station-building power-supply device 10 is similar to that of the first embodiment illustrated in FIG. 1. In the present embodiment, the calculation unit 55 records data on the regeneration determining voltage values calculated during a predetermined period. The calculation unit 55 does not output the regeneration determining voltage value to the comparison unit 44 of the main circuit section 4 every time the regeneration determining voltage value is calculated. Alternatively, the calculation unit 55 obtains the average value of the plurality of regeneration determining voltage values calculated during the predetermined period, and outputs the obtained average value of the regeneration determining voltage values to the comparison unit 44 of the main circuit section 4. The calculation unit 55 obtains the average value of the regeneration determining voltage values every predetermined period, and outputs the average value to the comparison unit 44 of the main circuit section 4.

As described above, according to the present embodiment, the calculation unit 55 obtains the average value of the regeneration determining voltage values calculated within the predetermined period, and outputs the average value of the regeneration determining voltage values to the comparison unit 44 every predetermined period. Consequently, an influence of a sudden variation of the overhead line voltage is reduced, and a value significantly different from the proper regeneration determining voltage value can be prevented from being output to the comparison unit 44. Since the timing at which the regeneration determining voltage value is changed is determined in accordance with the predetermined period, compilation of the data on the regeneration determining voltage values can be facilitated.

Sixth Embodiment.

The present embodiment where the calculation unit 55 records the calculated regeneration determining voltage values for a plurality of days will be described. Although the present embodiment is described using the station-building power-supply device 10 of the first embodiment, the present embodiment is applicable to the station building power supply devices 10*a*, 10*b*, and 10*c* of the second to fourth embodiments.

The configuration of the station-building power-supply device 10 is similar to that of the first embodiment illustrated in FIG. 1. In the present embodiment, the calculation unit 55 records, for the plurality of days, the data on the calculated regeneration determining voltage values together with information on points of times at which the regeneration determining voltage values are calculated. The calculation unit 55 does not output the regeneration determining voltage value to the comparison unit 44 every time the regeneration determining voltage value is calculated. Alternatively, the calculation unit 55 uses the data on the calculated regeneration determining voltage values for the plurality of days to calculate the regeneration determining voltage values at respective points of time for output to the main circuit section 4. The calculation unit 55 may obtain the average value as in the fifth embodiment by using information on the regeneration determining voltage values at the same point of time on different days. The calculation unit 55 may also obtain the optimal regeneration determining voltage value at each point of time by using a method other than a method of calculating the average value by using information on the regeneration determining voltage values at adjacent points of time.

The calculation unit 55 uses the regeneration determining voltage values obtained at the respective points of time to thereby automatically generate a schedule for regeneration determining voltage values in an operational time period of the electric vehicle 1. On the basis of the data on the regeneration determining voltage values obtained until the previous day, the calculation unit 55 generates the schedule for the regeneration determining voltage values in the operational time period on the next and subsequent days, that is, generates a prediction pattern of the variation of the regeneration determining voltage value. In the first to fifth embodiments, the calculated regeneration determining voltage value is utilized after the operational time period following the point of time of the calculation of the regeneration determining voltage value. In the present embodiment, however, using the schedule for the regeneration determining voltage values in the operational time period allows the regeneration determining voltage value at the current point of time to be estimated on the basis of the data on the regeneration determining voltage values at the same point of time until the previous day.

Figure 9:
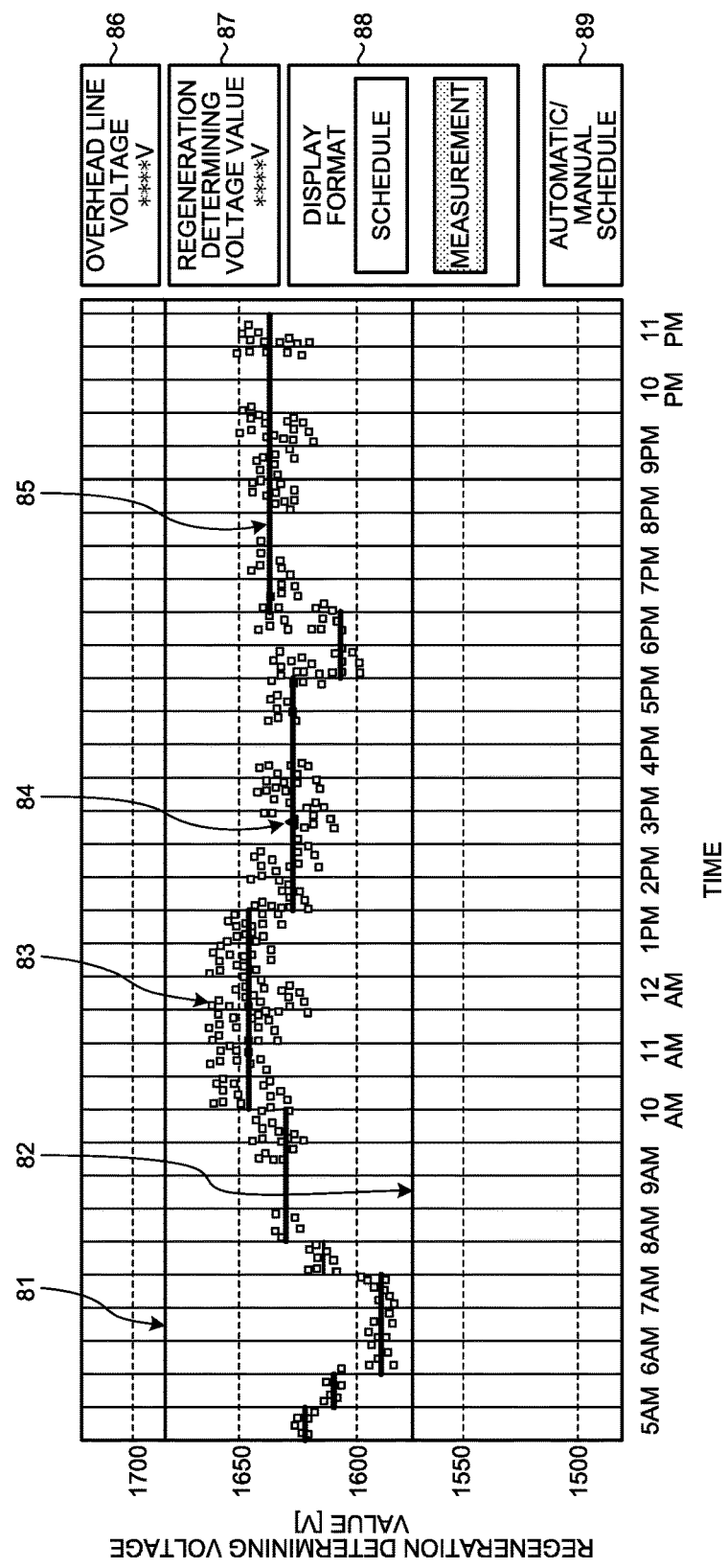
FIG. 9 is a diagram illustrating the calculated regeneration determining voltage values and the schedule for the regeneration determining voltage values automatically generated by a calculation unit, which are displayed on a display unit according to the sixth embodiment.

The control unit 53 performs control to display, on the display unit 54, the schedule automatically generated by the calculation unit 55. FIG. 9 is a diagram illustrating the calculated regeneration determining voltage values and the schedule for the regeneration determining voltage values automatically generated by the calculation unit 55, which are displayed on the display unit 54 according to the sixth embodiment. The regeneration determining voltage values at the respective points of time in the operational time period of the electric vehicle 1 are illustrated.

In FIG. 9, a setting upper limit value 81 and a setting lower limit value 82 set the voltage range of the regeneration determining voltage value. The setting upper limit value 81 and the setting lower limit value 82 may be the setting upper limit value and the setting lower limit value set by the voltage range setting unit 56 in the second and fourth embodiments. A regeneration determining voltage value 83 is data on the individual regeneration determining voltage value recorded in the calculation unit 55. Although the single regeneration determining voltage value is herein denoted by reference numeral 83, all the points plotted in FIG. 9 correspond to the regeneration determining voltage values 83. A triangular mark illustrated at a current value 84 represents the magnitude of the regeneration determining voltage value at the current point of time. A regeneration determining voltage value schedule 85 is a line indicating the regeneration determining voltage values set at the respective points of time. The current value 84 appears on the regeneration determining voltage value schedule 85.

An overhead line voltage 86 indicates the current voltage value of the overhead line 2. A regeneration determining voltage value 87 indicates the regeneration determining voltage value, indicated by the current value 84, at the current point of time. A display format 88 is a selection unit in which the user selects the schedule or the measurement to switch the display contents illustrated in FIG. 9 and displayed on the display unit 54. The measurement is selected in FIG. 9. An automatic/manual schedule 89 is a switching unit for switching the schedule displayed on the display unit 54 to the automatically generated schedule or a manually set schedule when the schedule is selected in the display format 88.

From the regeneration determining voltage values 83 and the regeneration determining voltage value schedule 85 illustrated in FIG. 9, it can be understood which data on the regeneration determining voltage values 83 the calculation unit 55 has used to calculate the regeneration determining voltage values at the respective points of time for output to the main circuit section 4.

Figure 10:
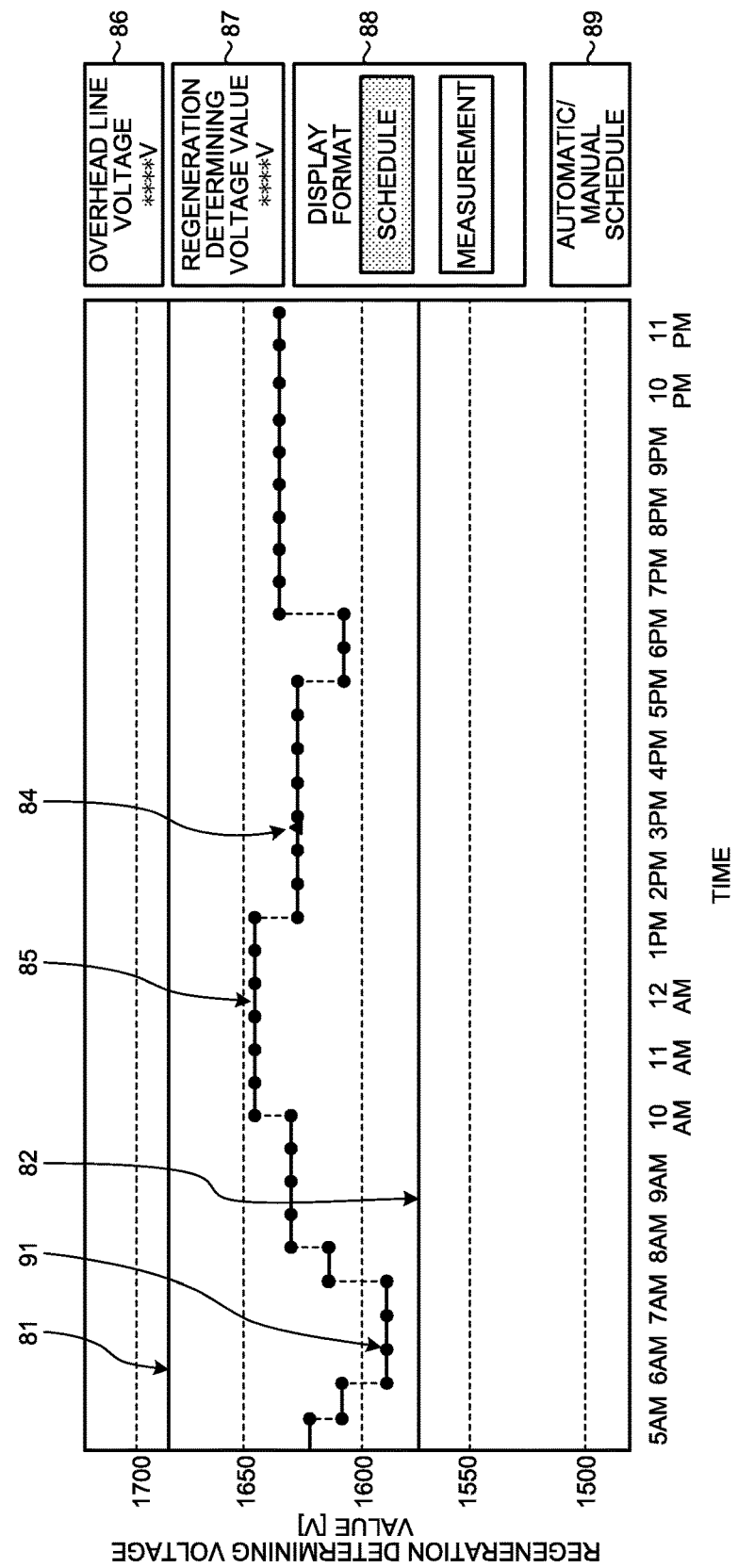
FIG. 10 is a diagram illustrating the schedule for the regeneration determining voltage values automatically generated by the calculation unit and displayed on the display unit according to the sixth embodiment.

FIG. 10 is a diagram illustrating the schedule for the regeneration determining voltage values automatically generated by the calculation unit 55 and displayed on the display unit 54 according to the sixth embodiment. In FIG. 10, the schedule is selected in the display format 88. In comparison with the regeneration determining voltage value schedule 85 illustrated in FIG. 9, a plot 91 is on the regeneration determining voltage value schedule 85 in FIG. 10. The plot 91 is a value calculated by the calculation unit 55 using the regeneration determining voltage values for the plurality of days, namely, the regeneration determining voltage value at each point of time for output to the main circuit section 4.

The user can understand the regeneration determining voltage values at the respective points of time in the operational time period of the electric vehicle 1 from the indication of FIG. 10 displayed on the display unit 54. The user may manually set the regeneration determining voltage values at the respective points of time via the control unit 53. Upon receiving, from the user, the input of the regeneration determining voltage values at respective points of time in the operational time period of the electric vehicle 1, the control unit 53 outputs information on the received regeneration determining voltage values to the calculation unit 55. On the basis of the information on the regeneration determining voltage values acquired via the control unit 53, the calculation unit 55 generates the schedule for the regeneration determining voltage values in the operational time period of the electric vehicle 1 on the basis of the manually set regeneration determining voltage values received from the user. The calculation unit 55 generates the manual-setting-based schedule in such a manner that the regeneration determining voltage values received from the user substitute for the values at the corresponding points of time in the automatically generated schedule mentioned above. Consequently, for example, in a case where the electric vehicle 1 is delayed or encounters an accident, the user can flexibly set the regeneration determining voltage value while confirming the situation of the voltage variation of the regeneration determining voltage value.

Figure 11:
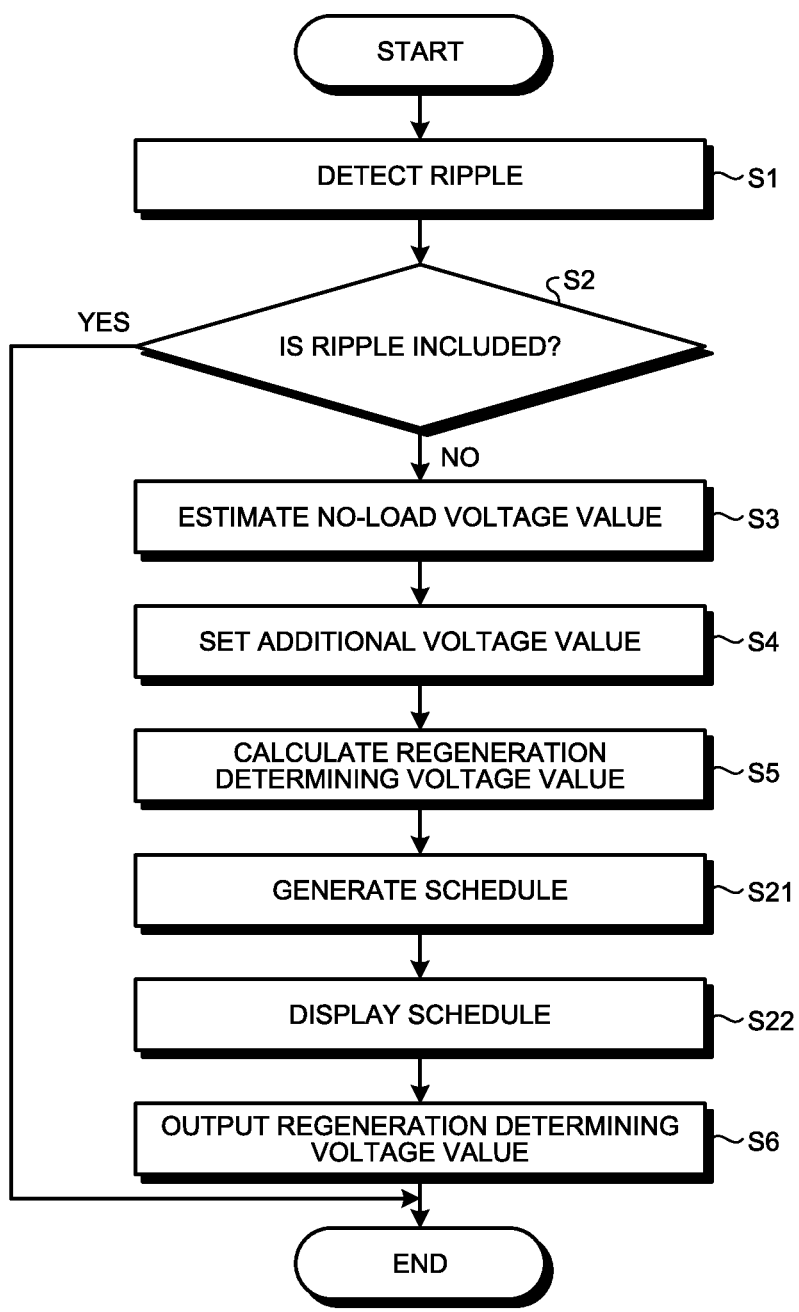
FIG. 11 is a flowchart illustrating processing in a method of calculating the regeneration determining voltage value in the station-building power-supply device according to the sixth embodiment.

The above operation is further described with reference to a flowchart. FIG. 11 is a flowchart illustrating processing in a method of calculating the regeneration determining voltage value in the station-building power-supply device 10 according to the sixth embodiment. In the present embodiment, in step S5, the calculation unit 55 records, for the plurality of days, the calculated regeneration determining voltage values together with the information on the points of time at which the regeneration determining voltage values are calculated, and uses the regeneration determining voltage values for the plurality of days to calculate the regeneration determining voltage values at the respective points of time for output to the main circuit section 4. Furthermore, the calculation unit 55 automatically generates the schedule for the regeneration determining voltage values in the operational time period of the electric vehicle 1 (step S21). The calculation unit 55 also receives via the control unit 53 the input of the regeneration determining voltage values at the respective points of time in the operational time period of the electric vehicle 1, and generates the schedule for the regeneration determining voltage values in the operational time period of the electric vehicle 1 on the basis of the manual setting (step S21). The control unit 53 then performs the control to display, on the display unit 54, the schedule automatically generated by the calculation unit 55 or the schedule generated on the basis of the manual setting (step S22). The processing in steps S1 to S6 is similar to the processing in the first embodiment illustrated in the flowchart of FIG. 3.

As described above, according to the present embodiment, the station-building power-supply device 10 records, for the plurality of days, the data on the calculated regeneration determining voltage values together with the information on the points of time at which the regeneration determining voltage values are calculated, and generates the schedule for the regeneration determining voltage values in the operational time period of the electric vehicle 1. Consequently, the variation of the regeneration determining voltage value can be predicted. Since the variation of the regeneration determining voltage value can be predicted, the regeneration determining voltage value can be set by the user in response to the time-period-dependent variation of the no-load voltage. Since the data on the regeneration determining voltage values for the plurality of days is used, an influence of a sudden variation of the overhead line voltage that has occurred by the previous day is reduced, and data on a value significantly different from the proper regeneration determining voltage value can be prevented from being utilized as they are.

The configuration described in the above-mentioned embodiments indicates an example of the contents of the present invention. The configuration can be combined with another well-known technique, and a part of the configuration can be omitted or changed in a range not departing from the gist of the present invention.

REFERENCE SIGNS LIST

1 electric vehicle, 2 overhead line, 3 rail, 4, 4*b* main circuit section, 5, 5*a*, 5*b*, 5*c* station-building power-supply operation panel, 6 high-voltage distribution system, 7 station building, 8 transformer, 9, 9-1, 9-2, ..., 9-n station load, 10, 10a, 10b, 10c station-building power-supply device, 41 power conversion unit, 42 voltage sensor, 43 ripple detection unit, 44 comparison unit, 51 ripple determination unit, 52 no-load voltage estimation unit, 53 control unit, 54 display unit, 55 calculation unit, 56 voltage range setting unit, 57 voltage determination unit.

The invention claimed is:

1. A station-building power-supply device comprising:
    a ripple detector to detect a ripple included in an overhead line voltage and output information on the detected ripple;
    a ripple determiner to compare the information on the ripple with a ripple threshold value for determining whether a ripple is included in the overhead line voltage, and output a ripple peak voltage obtained when a ripple is determined to be not included in the overhead line voltage, on a basis of a result of the comparison;
    a no-load voltage estimator to obtain an effective value of the ripple to thereby estimate a no-load voltage value that is a voltage value of an overhead line obtained when the overhead line is in a no-load state, the effective value of the ripple having a peak that is the ripple peak voltage; and
    a calculator to calculate a regeneration determining voltage value for determining whether an electric vehicle connected to the overhead line performs regenerative operation, and output the regeneration determining voltage value to a main circuit that utilizes regenerative energy generated by the regenerative operation, wherein
    in calculating the regeneration determining voltage value, the calculator calculates the regeneration determining voltage value to be higher than the no-load voltage value by a predetermined value.

2. The station-building power-supply device according to claim 1, comprising:
    a voltage range setter to set a voltage range of the no-load voltage value; and
    a voltage determiner to determine whether the no-load voltage value estimated by the no-load voltage estimator is within the voltage range set by the voltage range setter, and output the no-load voltage value to the calculator when the no-load voltage value is within the voltage range.

3. The station-building power-supply device according to claim 1, wherein
    the calculator records a plurality of the regeneration determining voltage values calculated during a predetermined period, and uses an average value of the recorded regeneration determining voltage values as the regeneration determining voltage value that is output to the main circuit.

4. The station-building power-supply device according to claim 1, comprising:
    a display to display information on the regeneration determining voltage value: and
    a controller to control the display, wherein
    the calculator records, for a plurality of days, a plurality of the calculated regeneration determining voltage values together with information on points of time at which the regeneration determining voltage values are calculated, uses the regeneration determining voltage values for the plurality of days to calculate regeneration determining voltage values at respective points of time for output to the main circuit, and automatically generates a schedule for regeneration determining voltage values in an operational time period of the electric vehicle, and
    the controller performs control to display the schedule on the display.

5. The station-building power-supply device according to claim 4, wherein
    the calculator receives, via the controller, input of the regeneration determining voltage values at respective points of time in the operational time period of the electric vehicle, and generates a schedule for the regeneration determining voltage values in the operational time period of the electric vehicle on a basis of manual setting, and
    the controller performs control to display, on the display, the schedule automatically generated by the calculator or the schedule generated on a basis of the manual setting.

6. A method of computing a regeneration determining voltage value, the method comprising:
    detecting, a ripple included in an overhead line voltage and outputting information on the detected ripple;
    comparing the information on the ripple with a ripple threshold value for determining whether a ripple is included in the overhead line voltage, and outputting a ripple peak voltage obtained when a ripple is determined to be not included in the overhead line voltage, on a basis of a result of the comparison;
    obtaining an effective value of the ripple to thereby estimate, a no-load voltage value that is a voltage value of an overhead line obtained when the overhead line is in a no-load state, the effective value of the ripple having a peak that is the ripple peak voltage; and
    calculating a regeneration determining voltage value for determining whether an electric vehicle connected to the overhead line performs regenerative operation, and outputting the regeneration determining voltage value to a main circuit that utilizes regenerative energy generated by the regenerative operation, wherein calculating the regeneration determining voltage value includes calculating the regeneration determining voltage value to be higher than the no-load voltage value by a predetermined value.

7. The method of calculating a regeneration determining voltage value according to claim 6, the method comprising:
    setting a voltage range of the no-load voltage value; and
    determining whether the estimated no-load voltage value is within the set voltage range, and outputting the no-load voltage value for use in calculating the regeneration determining voltage value when the no-load voltage value is within the voltage range.

8. The method of computing a regeneration determining voltage value according to claim 6, wherein
    calculating the regeneration determining voltage value includes recording a plurality of the regeneration determining voltage values calculated during a predetermined period, and using an average value of the recorded regeneration determining voltage values as the regeneration determining voltage value that is output to the main circuit.

9. The method of calculating a regeneration determining voltage value according to claim 6, wherein
    calculating the regeneration determining voltage value includes recording, for a plurality of days, a plurality of the calculated regeneration determining voltage values together with information on points of time at which the regeneration determining voltage values are calculated, and using the regeneration determining voltage values for the plurality of days to calculate regeneration determining voltage values at respective points of time for output to the main circuit, and the method further comprises:

automatically generating a schedule for regeneration determining voltage values in an operational time period of the electric vehicle; and performing control to display the schedule on a display.

10. The method of calculating a regeneration determining voltage value according to claim 9, wherein generating the schedule includes receiving input of the regeneration determining voltage values at respective points of time in the operational time period of the electric vehicle, and generating a schedule for the regeneration determining voltage values in the operational time period of the electric vehicle on a basis of manual setting, and performing the control to display the schedule on the display includes performing control to display, on the display, the automatically generated schedule or the schedule generated on a basis of the manual setting.

* * * * *